(12) United States Patent
Golo

(10) Patent No.: US 7,260,152 B2
(45) Date of Patent: Aug. 21, 2007

(54) METHOD AND DEVICE FOR INJECTING A NOISE SIGNAL INTO A PAIRED WIRE COMMUNICATION LINK

(75) Inventor: Dragan Golo, Kanata (CA)

(73) Assignee: Spirent Communications, Ottawa, Ontario (CA)

( * ) Notice: Subject to any disclaimer, the term of this patent is extended or adjusted under 35 U.S.C. 154(b) by 795 days.

(21) Appl. No.: 10/243,691

(22) Filed: Sep. 16, 2002

(65) Prior Publication Data
US 2004/0028144 A1   Feb. 12, 2004

Related U.S. Application Data

(60) Provisional application No. 60/401,346, filed on Aug. 7, 2002.

(51) Int. Cl.
*H04B 3/00* (2006.01)

(52) U.S. Cl. .................. 375/257; 375/258; 375/222; 370/480; 370/200; 379/377

(58) Field of Classification Search ............. 375/258, 375/346, 257, 222; 379/402, 377; 370/480, 370/200
See application file for complete search history.

(56) References Cited

U.S. PATENT DOCUMENTS

| | | | | |
|---|---|---|---|---|
| 5,822,426 A | * | 10/1998 | Rasmus et al. | 379/402 |
| 6,052,420 A | * | 4/2000 | Yeap et al. | 375/346 |
| 2003/0169875 A1 | * | 9/2003 | Lee et al. | 379/399.01 |
| 2003/0215020 A1 | * | 11/2003 | Dong et al. | 375/258 |

OTHER PUBLICATIONS

"RFI Tone Injection", excerpt from ITU G.TEST.bis, Feb. 4, 2000.
Henkel et al., "Noise Injection Device", ETSI STC TM6, Stockholm Sweden, Sep. 10-14, 2001.

* cited by examiner

*Primary Examiner*—Chieh M. Fan
*Assistant Examiner*—Eva Zheng
(74) *Attorney, Agent, or Firm*—Freedman & Associates

(57) ABSTRACT

The present invention relates to a device and method for injecting a noise signal into a wire pair of a communication link. In operation a differential mode noise signal is received at a first and a second input port, which are connected via a first and a second resistor to a first and a second end tap of a primary coil of a transformer, respectively. The transformed differential mode noise signal is then transmitted via a first and a second end tap of a secondary coil of the transformer and a third and a fourth resistor to a first and a second output port for injection at high impedance into a first and a second wire of the communication link. Optionally, the device comprises a third input port connected to a center tap of the secondary coil for receiving a common mode noise signal. The common mode noise signal is then provided at low impedance to the first and the second wire via the first and the second end tap of the secondary coil and via the third and fourth resistor having low impedance, respectively. The device allows injection of a noise signal into the communication link at a desired location without splitting the same. Furthermore, the device allows injection of differential mode noise signals and common mode noise signals using same circuitry without switching and/or rewiring between different electrical circuits.

19 Claims, 3 Drawing Sheets injecting a differential mode noise signal into the communication link by performing the steps of:

> receiving the differential mode noise signal
>
> ↓
>
> transforming the differential mode noise signal in a transformer stage having a first and a second resistor connected to a first and a second end tap of a primary coil of a transformer for provisions at high impedance
>
> ↓
>
> providing the transformed differential mode noise to a first and a second wire via a third and a fourth resistor interposed between a first and a second end tap of a secondary coil of the transformer and the first and second wire, respectively, the third and the fourth resistor having low impedance

↓ switching without rewiring for injecting a common mode noise signal into the communication link be performing the steps of:

> receiving the common mode noise signal at a center tap of the secondary coil.
>
> ↓
>
> providing the common mode noise signal at low impedance via the first and the second end tap of the secondary coil and the third and fourth resistor to the first and second wire, respectively

Fig. 2b

METHOD AND DEVICE FOR INJECTING A NOISE SIGNAL INTO A PAIRED WIRE COMMUNICATION LINK

This application claims benefit from U.S. Provisional Application No. 60/401,346 filed Aug. 7, 2002.

FIELD OF THE INVENTION

This invention relates to communication systems and in particular to a method and a device for injecting a noise signal into a paired wire communication link for testing.

BACKGROUND OF THE INVENTION

Recently, there have been dramatic changes in the telecommunications industry. For example, deregulation of local markets resulted in the emergence of new technologies in this industry. Furthermore, a growing demand for Internet access sparked development of new technologies that deliver high speed data services using existing infrastructure.

As is well known in the industry, Digital Subscriber Line, or DSL, is one of the most promising new technologies for delivering superior service and high speed connections using the existing infrastructure. DSL service is implemented in several different ways, such as asymmetrical DSL, or ADSL, where upstream and downstream have different bandwidths, symmetrical DSL, or SDSL, where upstream and downstream have the same bandwidth. In general, these DLS services use the existing copper loop that is used for conventional telephony but provide much higher bandwidth. However, to achieve such high data rates, DSL services operate at higher frequencies and are thus more sensitive to the length and quality of the copper loop. So-called plain old telephone service (POTS) lines have been originally designed for voice communications which cover a limited frequency bandwidth of about 4 KHz. As a result, a POTS line that works well transmitting voice signals might not work well for data signals. Therefore, sophisticated testing is needed to find out which lines are not suitable for data transmission and why particular lines are unable to support DSL data transmission.

In order to test the data transmission through a POTS line noise signals simulating cross talk impulses and RF ingress are injected into the line under test. The noise signals need to be injected at an appropriate voltage level without disturbing the impedance of the line under test, or more specific, the test loop. In particular, differential mode noise signals need to be injected at high impedance while common mode noise signals need to be injected at low impedance. In prior art systems noise in injected at an end of a line, via resistors having a large resistance for differential mode noise signals or via resistors having a low resistance for common mode noise signals. Injecting a differential noise signal using such a system requires high supply voltages and an analog circuitry providing such high voltages. Furthermore, it requires switching between two electrical circuits for injecting a noise signal in differential mode and in common mode. An alternative system utilizes inductive coupling by inserting transformer coils into the line in order to overcome the drawback of high supply voltages. However, in both prior art systems the line needs to be uncoupled at one end or split for injecting of the noise signal.

SUMMARY OF THE INVENTION

It is, therefore, an object of the invention to overcome the drawbacks of the prior art by providing a method and device for injecting a noise signal at a desired location of a communication link.

It is further an object of the invention to method and device capable of injecting a differential mode noise signal as well as a common mode noise signal without switching between different electrical circuits.

In accordance with the present invention there is provided a device for injecting a noise signal into a first wire and a second wire of a communication link comprising: a first input port; a second input port for, in combination with the first input port, receiving a differential mode noise signal for being injected into the communication link; a first transformer having a primary coil and a secondary coil, the primary coil and the secondary coil, each having a first end tap and a second end tap, the first end tap and the second end tap of the primary coil coupled to the first input port and the second input port, respectively; a first output port in electrical communication with the first end tap of the secondary coil, the first output port for being connected to the first wire, for injecting a first portion of the differential mode noise signal into the communication link; a second output port in electrical communication with the second end tap of the secondary coil, the second output port for being connected to the second wire, for injecting at least a second portion of the differential mode noise signal into the communication link; a first resistor interposed between the first input port and the first end tap of the primary coil; and, a second resistor interposed between the second input port and the second end tap of the primary coil, the first resistor and the second resistor providing a high impedance at the first output port and the second output port.

In accordance with an aspect of the present invention there is provided a device for injecting a noise signal into a first wire and a second wire of a communication link comprising: a third input port for receiving a common mode noise signal for being injected into the communication link; a first transformer having a primary coil and a secondary coil, the primary coil having a first end tap, a center tap and a second end tap, the secondary coil, having a first end tap and a second end tap, the center tap of the primary coil coupled to the third input port; a first output port in electrical communication with the first end tap of the secondary coil, the first output port for being connected to the first wire, for injecting the common mode noise signal into the communication link; a second output port in electrical communication with the second end tap of the secondary coil, the second output port for being connected to the second wire, for injecting the common mode noise signal into the communication link; a third resistor disposed between the secondary coil and the first output port, the third resistor having low impedance; and, a fourth resistor, disposed between the secondary coil and the second output port, the fourth resistor having low impedance.

In accordance with an aspect of the present invention there is also provided a method for injecting a noise signal into a pair of wires of a communication link comprising the steps of: injecting a differential mode noise signal into the communication link by performing the steps of: receiving the differential mode noise signal; transforming the differential mode noise signal in a transformer stage having a first and a second resistor connected to a first and a second end tap of a primary coil of a transformer for provision at high impedance; and, providing the transformed differential mode noise signal to a first and a second wire via a third and a fourth resistor interposed between a first and a second end tap of a secondary coil of the transformer and the first and the second wire, respectively, the third and the fourth resistor having low impedance; and, switching without rewiring for injecting a common mode noise signal into the communication link by performing the steps of: receiving the common mode noise signal at a center tap of the secondary coil; and, providing the common mode noise signal at low impedance via the first and the second end tap of the secondary coil and the third and the fourth resistor to the first and the second wire, respectively.

In accordance with an aspect of the present invention there is also provided a communication device tested by the steps of: injecting a noise signal into a signal propagating within a line coupled with the communication device with a noise injection circuit comprising: a first input port; a second input port for, in combination with the first input port, receiving a differential mode noise signal for being injected into the communication link; a first transformer having a primary coil and a secondary coil, the primary coil and the secondary coil, each having a first end tap and a second end tap, the first end tap and the second end tap of the primary coil coupled to the first input port and the second input port, respectively; a first output port in electrical communication with the first end tap of the secondary coil, the first output port for being connected to the first wire, for injecting a first portion of the differential mode noise signal into the communication link; a second output port in electrical communication with the second end tap of the secondary coil, the second output port for being connected to the second wire, for injecting at least a second portion of the differential mode noise signal into the communication link; a first resistor interposed between the first input port and the first end tap of the primary coil; and, a second resistor interposed between the second input port and the second end tap of the primary coil, the first resistor and the second resistor providing a high impedance at the first output port and the second output port; and, testing the device performance in the presence of the injected noise.

BRIEF DESCRIPTION OF THE FIGURES

Exemplary embodiments of the invention will now be described in conjunction with the following drawings, in which:

FIG. 2b is a simplified flow diagram of a method for injecting a noise signal into a pair of wires of a communication link according to the invention; and, FIG. 3 is a simplified circuit diagram of a device for injecting a noise signal into a pair of wires of a communication link according to the invention.

DETAILED DESCRIPTION OF THE INVENTION

Figure 1:
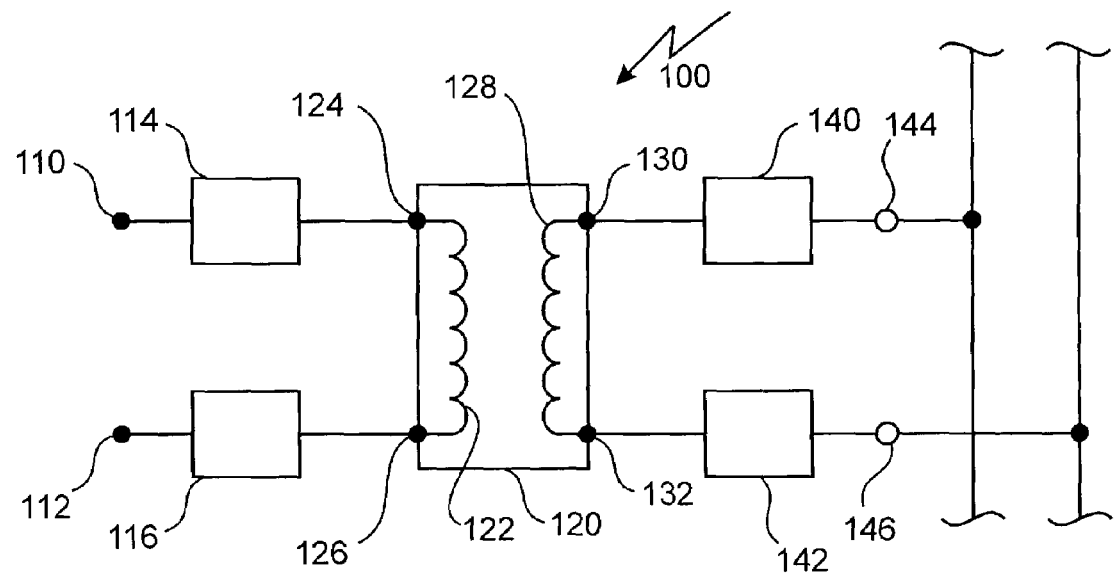
FIG. 1 is a simplified circuit diagram of a device for injecting a noise signal into a pair of wires of a communication link according to the invention.

Referring to FIG. 1 a simple embodiment of a device 100 for injecting a noise signal into a pair of wires of a communication link according to the invention is shown. In operation a differential mode noise signal is received at input ports 110 and 112, which are connected via resistors 114 and 116 to end taps 124 and 126 of a primary coil 122 of transformer 120, respectively. The transformed differential mode noise signal is then transmitted via end taps 130 and 132 of a secondary coil 128 of the transformer 120 and resistors 140 and 142 to output ports 144 and 146 for injection into a first and a second wire of the communication link. In order to not disturb the impedance of a communication link under test the differential mode noise signal is injected at high impedance. This is achieved in the device 100 through the combination of the resistors 114 and 116 having relatively high impedance with a predetermined range with the transformer 120. By combining a resistor with a transformer as shown in FIG. 1 an impedance proportional to $Rn^2$ is achieved with R being resistance of the resistor and n being the ratio of the windings of the primary coil 122 and the secondary coil 128 of the transformer 120. Compared to prior art devices using only resistors for injecting the differential mode noise signal the device 100 obviates the need for high supply voltages and the analog circuitry supporting such high voltages. Furthermore, a same impedance of the differential mode signal is achieved with resistors having much smaller resistance values, thereby substantially reducing energy losses and, consequently, heat, which is highly advantageous when the circuitry for noise injection is integrated with other electrical components on a circuit board. A major drawback of prior art devices is the coupling to the communication link allowing noise injection only at the ends of a communication link and/or splitting of the communication link for inserting circuit components into the communication link substantially rendering testing and testing equipment inflexible. This major drawback of the prior art is overcome by device 100 allowing injection of a noise signal into the communication link at a desired location without splitting the same, as shown in FIG. 1. Thus, flexibility for testing is substantially increased providing, for example, the capability of manufacturing the noise injection circuit on a circuit board, which is then inserted into a testing device. Design of the components of the device 100 provides operating performance for testing communication links for DSL service such as an operating frequency bandwidth between 4 KHz and 2.2 MHz and linearity within 0.05 dB. Testing is performed, for example, in combination with the evaluation method shown in FIG. 6 of U.S. patent application Ser. No. 60/401,339 filed Aug. 07, 2002.

Optionally, the resistors 114 and 116 have variable impedance for tuning of the impedance during a calibration step. For example, the tuning step allows adjusting of the noise injection into the communication link after connection thereto.

Figure 2A:
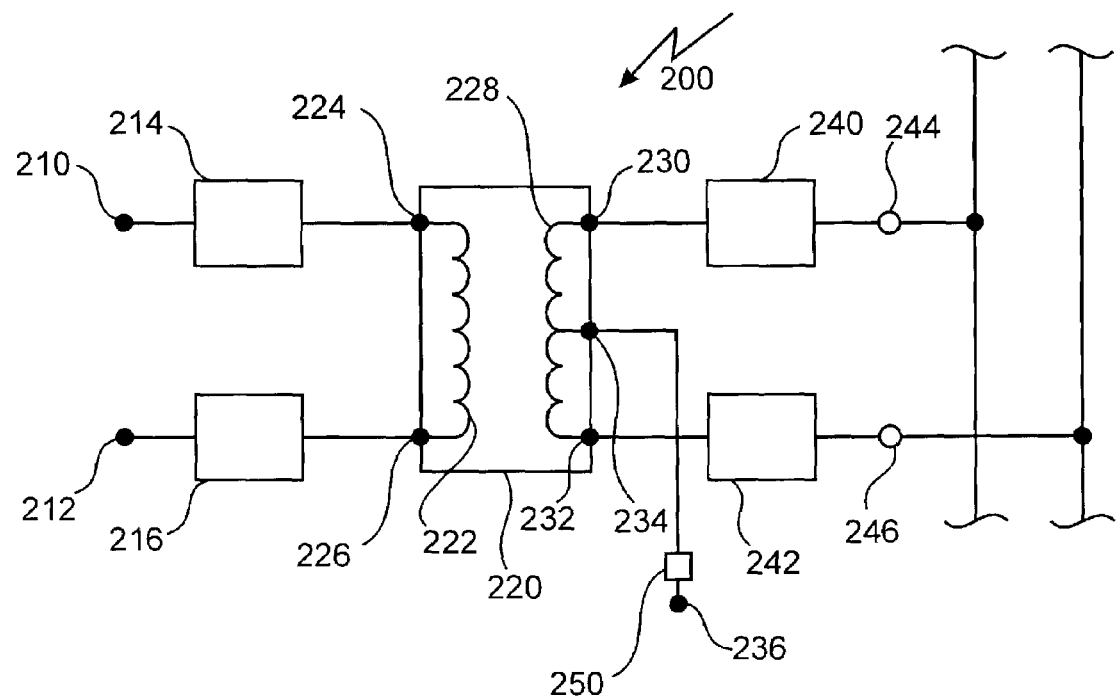
FIG. 2a is a simplified circuit diagram of a device for injecting a noise signal into a pair of wires of a communication link according to the invention.

Referring to FIG. 2a another embodiment of a device 200 for injecting noise into a pair of wires of a communication link according to the invention is shown. The device 200 includes the same components and circuitry as device 100 but has an additional third input port 236 connected to center tap 234 of secondary coil 228 of transformer 220. In operation a common mode noise signal is received at the third input port 236 and provided at low impedance via a first 230 and a second 232 end tap of the secondary coil 228 and a third 240 and fourth 242 resistor to output ports 244 and 246 for injection into a first and a second wire of the communication link, respectively. As is evident, the resistors 240 and 242 have low impedance in order to inject the common mode noise signal into the communication link at low impedance. Optionally, a resistor 250 is interposed between the third input port 236 and the center tap 234 in order to provide linearity and/or output impedance in common mode adjustment. As shown in FIG. 2a, the device 200 allows injection of the noise signal—here a common mode noise signal—into a communication link without splitting the same.

Furthermore, the device 200 is capable of receiving and injecting a differential mode noise signal as described above with respect to device 100. This results in a highly advantageous feature of device 200 by allowing injection of a differential mode noise signal at high impedance and a common mode noise signal at low impedance using same electrical circuitry as shown in FIG. 2b, thus obviating switching and/or rewiring between different electrical circuits. Here, in operation a differential mode noise signal is received at input ports 210 and 212 transformed in the transformer 220 and provided via the resistors 240 and 242 to the output ports 244 and 246 for injecting into the communication link at high impedance. The high impedance of the differential mode noise signal is provided through the combination of resistors 214 and 216 and the transformer 220. A common mode noise signal is then injected by just providing the common mode noise signal to the input port 236, which is then injected into the communication link via the end taps 230 and 232, the resistors 240 and 242 and the output ports 244 and 246, without switching or rewiring of the device 200. This feature is highly advantageous for the design of testing equipment as well as the testing procedure itself. Firstly, no switching components and only one electrical circuit are needed for injecting a noise signal in differential mode, as well as in common mode, substantially reducing complexity and number of electrical components. Therefore, design of the injection device is substantially simplified allowing easy integration onto a circuit board and reduced manufacturing costs. Secondly, obviating switching and/or rewiring substantially facilitate testing.

Figure 3:
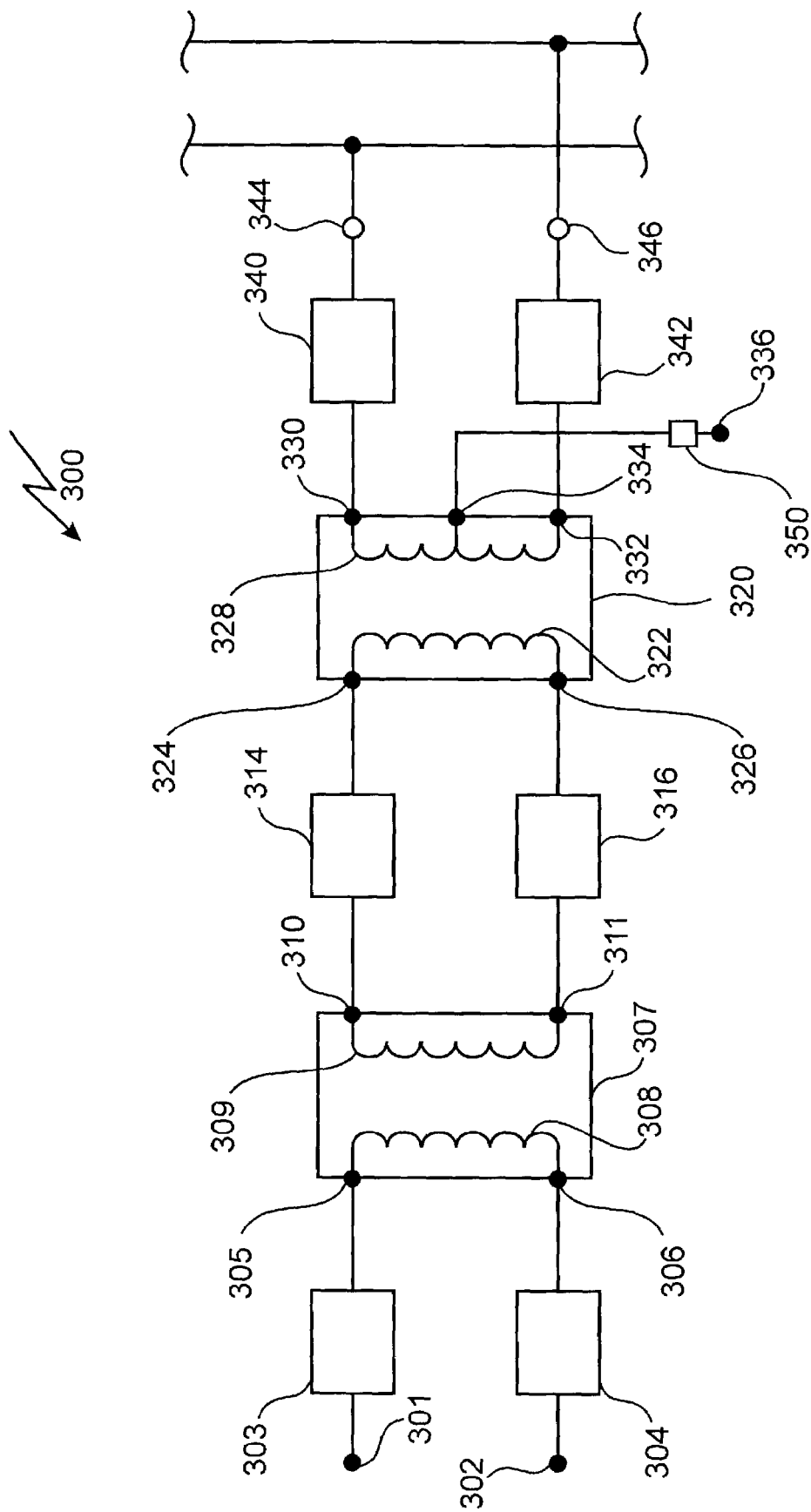

Referring to FIG. 3 a preferred embodiment 300 of a device for injecting a noise signal into a pair of wires of a communication link according to the invention is shown. In operation a differential mode noise signal is received at input ports 301 and 302, which are connected via resistors 303 and 304 to end taps 305 and 306 of a primary coil 308 of first transformer 307, respectively. The differential mode noise signal is then transmitted via end taps 310 and 311 of a secondary coil 309 of the transformer 307 to end taps 324 and 326 of a primary coil 322 of second transformer 320, respectively, for a second stage of transformation. Optionally, resistors 314 and 316 are interposed between the end taps 310 and 311 of the secondary coil 309 of the transformer 307 and the end taps 324 and 326 of the primary coil 322 of the second transformer 320, respectively. The transformed differential mode noise signal is then transmitted via end taps 330 and 332 of a secondary coil 328 of the transformer 320 and resistors 340 and 342 to output ports 344 and 346 for injection at high impedance into a first and a second wire of the communication link. Optionally, a third input port 336 for receiving a common mode noise signal is connected to center tap 334 of the secondary coil 328 of the second transformer 320. In operation, the common mode noise signal is provided to the output ports 344 and 346 via end taps 330 and 332 and resistors 340 and 342 having low impedance, respectively, for injecting a low impedance signal into the first and second wire. Optionally, a resistor 350 is interposed between the third input port 336 and the center tap 334 in order to provide linearity and/or output impedance in common mode adjustment. Further optionally, the resistors 303, 304, 314, and 316 have variable impedance for tuning during a calibration step. In an exemplary embodiment the transformers 307 and 320 have a ratio of 1:2.4, the resistors 303 and 304 each have a resistance of 150 Ohm, the resistors 314 and 316 each have a resistance of 25 Ohm, the resistors 340 and 342 each have a resistance of 100 Ohm resistor 350 has a resistance of 50 Ohm. For the given values the output impedance is then greater than 8 k Ohm. As is evident, it is possible to choose other values, as long as the combination of resistor values and transformer ratios is chosen such that a desired frequency response and linearity of the device 300 is achieved. Using two smaller transformers instead of one bigger transformer has numerous advantages. For example, smaller transformers have a sharper roll off in their frequency response, have less capacitance, wider bandwidth, dissipate substantially less heat, and are cheaper. Furthermore, because of the smaller size and substantially smaller heat dissipation smaller transformers provide substantially more flexibility for the circuit design and allow placement of more components on a circuit board. For example, using a plurality of smaller size transformers substantially facilitates the design of a noise injection device having a desired performance with respect to operating frequency, roll off, and linearity. Preferably, the first and the second transformer have approximately a same frequency response for providing a sharp roll off. As noted above, the device 300 also allows for injection of the noise signals into the first and the second wires without splitting the communication link, but is not limited thereto.

Numerous other embodiments of the invention will be apparent to persons skilled in the art without departing from the spirit and scope of the invention as defined in the appended claims.

What is claimed is:

1. A device for injecting a noise signal into a first wire and a second wire of a communication link comprising:

a first input port;

a second input port for, in combination with the first input port, receiving a differential mode noise signal for being injected into the communication link;

a first transformer having a primary coil and a secondary coil, the primary coil and the secondary coil, each having a first end tap and a second end tap, the first end tap and the second end tap of the primary coil coupled to the first input port and the second input port, respectively;

a first output port in electrical communication with the first end tap of the secondary coil, the first output port for being connected to the first wire, for injecting a first portion of the differential mode noise signal into the communication link;

a second output port in electrical communication with the second end tap of the secondary coil, the second output port for being connected to the second wire, for injecting at least a second portion of the differential mode noise signal into the communication link;

a first resistor interposed between the first input port and the first end tap of the primary coil; and, a second resistor interposed between the second input port and the second end tap of the primary coil, wherein the device when measured from the first and second output ports has a high impedance for not disturbing an impedance of the communication link and, wherein the first resistor and the second resistor have an impedance substantially lower than the high impedance.

2. A device according to claim 1, comprising:

a third resistor disposed between the secondary coil and the first output port; and, a fourth resistor, disposed between the secondary coil and the second output port, wherein the third and the fourth resistor have low impedance for injecting a common mode noise signal into the communication link.

3. A device as defined in claim 2, wherein the first and the second output port are for being connected to the first and the second wire without splitting the communication link.

4. A device as defined in claim 1, wherein the communication link is used for providing DSL conformant communication.

5. A device as defined in claim 4, wherein the first and the second resistor have variable impedance for tuning during a calibration step.

6. A device as defined in claim 2, comprising:
a third input port connected to a center tap of the secondary coil for receiving the common mode noise signal, the common mode noise signal for being provided at low impedance to the first and the second wire via the first and the second output ports, respectively.

7. A device according to claim 1, comprising:
a second transformer disposed between the secondary coil of the first transformer and the first output port and between the secondary coil of the first transformer and the second output port.

8. A device for injecting a noise signal into a first wire and a second wire of a communication link comprising:
a first input port for receiving a common mode noise signal for being injected into the communication link;
a first transformer having a primary coil and a secondary coil, the primary coil having a first end tap, a center tap and a second end tap, the secondary coil, having a first end tap and a second end tap, the center tap of the primary coil coupled to the first input port;
a first output port in electrical communication with the first end tap of the secondary coil, the first output port for being connected to the first wire, for injecting the common mode noise signal into the communication link;
a second output port in electrical communication with the second end tap of the secondary coil, the second output port for being connected to the second wire, for injecting the common mode noise signal into the communication link;
a first resistor disposed between the secondary coil and the first output port; and,
a second resistor, disposed between the secondary coil and the second output port, wherein the first and the second resistor have low impedance for injecting the common mode noise signal into the communication link.

9. A device as defined in claim 8, comprising:
a second input port;
a third input port;
a third resistor interposed between the second input port and the first end tap of the primary coil; and,
a fourth resistor interposed between the third input port and the second end tap of the primary coil, the third resistor and the fourth resistor providing a high impedance at the first output port and the second output port for not disturbing an impedance of the communication link.

10. A device as defined in claim 9, wherein the device when measured from the first and second output ports has the high impedance and, wherein the third resistor and the fourth resistor have an impedance substantially lower than the high impedance.

11. A device as defined in claim 7, wherein the first and the second resistor have variable impedance for tuning during a calibration step.

12. A device as defined in claim 7, wherein the first and the second transformer have a same frequency response.

13. A device as defined in claim 7, comprising:
a third resistor disposed between the secondary coil and the first output port; and,
a fourth resistor, disposed between the secondary coil and the second output port, wherein the third and the fourth resistor have low impedance for injecting a common mode noise signal into the communication link.

14. A device as defined in claim 13, comprising:
a third input port connected to a center tap of the secondary coil of the second transformer for receiving the common mode noise signal, the common mode noise signal for being provided at low impedance to the first and the second wire via the first and the second end tap of the secondary coil of the second transformer and the third and fourth resistor, respectively.

15. A device as defined in claim 7, comprising a fifth and a sixth resistor interposed between the first and the second end tap of the secondary coil of the first transformer and the first and the second end tap of the primary coil of the second transformer, respectively.

16. A device as defined in claim 15, wherein the fifth and the sixth resistor have variable impedance for tuning during a calibration step.

17. A method for injecting a noise signal into a pair of wires of a communication link comprising:
receiving the differential mode noise signal;
transforming the differential mode noise signal in a transformer stage having a first and a second resistor connected to a first and a second end tap of a primary coil of a transformer for provision at high impedance for not disturbing an impedance of the communication link; and,
providing the transformed differential mode noise signal to a first and a second wire via a third and a fourth resistor interposed between a first and a second end tap of a secondary coil of the transformer and the first and the second wire, respectively, the third and the fourth resistor having low impedance for injecting a common mode noise signal into the communication link;
receiving a common mode noise signal at a center tap of the secondary coil; and, providing the common mode noise signal at low impedance via the first and the second end
tap of the secondary coil and the third and the fourth resistor to the first and the second wire, respectively.

18. A method according to claim 17, wherein the differential mode noise signal and the common mode noise signal are provided to the first and the second wire without splitting the communication link.

19. A method for injecting a noise signal into a signal propagating within a line coupled with a communication device comprising:
receiving a differential mode noise signal;
transforming the differential mode noise signal in a transformer stage having a first and a second resistor connected to a first and a second end tap of a primary coil of a transformer for provision at high impedance for not disturbing an impedance of the communication link and, wherein the first resistor and the second resistor have an impedance substantially lower than the high impedance; and,
providing the transformed differential mode noise signal to a first and a second wire of the line via a first and a second output port in electrical communication with a first and a second end tap of a secondary coil of the transformer, respectively; and,
testing the device performance in the presence of the injected noise.

* * * * *